United States Patent
Zhang et al.

(10) Patent No.: US 11,861,487 B1
(45) Date of Patent: Jan. 2, 2024

(54) LOW-POWER AND COMPACT NEURON CIRCUIT IMPLEMENTING RELU ACTIVATION FUNCTION

(71) Applicant: ZJU-Hangzhou Global Scientific and Technological Innovation Center, Hangzhou (CN)

(72) Inventors: Yishu Zhang, Hangzhou (CN); Xuemeng Fan, Hangzhou (CN); Hua Wang, Hangzhou (CN); Zijian Wang, Hangzhou (CN)

(73) Assignee: ZJU-Hangzhou Global Scientific and Technological Innovation Center, Hangzhou (CN)

( * ) Notice: Subject to any disclaimer, the term of this patent is extended or adjusted under 35 U.S.C. 154(b) by 0 days.

(21) Appl. No.: 18/325,029

(22) Filed: May 29, 2023

(30) Foreign Application Priority Data

Jan. 3, 2023 (CN) .......................... 202310000898.1

(51) Int. Cl.
 *G06N 3/063* (2023.01)
 *G06N 3/048* (2023.01)
(52) U.S. Cl.
 CPC ............. *G06N 3/063* (2013.01); *G06N 3/048* (2023.01)
(58) Field of Classification Search
 CPC ................................ G06N 3/063; G06N 3/048
 See application file for complete search history.

(56) References Cited

U.S. PATENT DOCUMENTS

| | | |
|---|---|---|
| 2018/0075337 A1 | 3/2018 | Buchanan et al. |
| 2019/0286976 A1* | 9/2019 | Tran ....................... G06N 3/045 |
| 2020/0019835 A1 | 1/2020 | Park et al. |
| 2021/0271961 A1 | 9/2021 | Bozbey et al. |
| 2022/0027130 A1* | 1/2022 | Kashmiri ............... G06N 3/048 |

OTHER PUBLICATIONS

CNIPA, Notification to grant patent right for Chinese application CN202310000898.1, dated Mar. 10, 2023.

* cited by examiner

*Primary Examiner* — Eric Nilsson
(74) *Attorney, Agent, or Firm* — Zhigang Ma

(57) ABSTRACT

Disclosed is a low-power and compact neuron circuit implementing a ReLU activation function including a first-layer synaptic array, a neuron transistor, a resistor, and a second-layer synaptic array. The neuron transistor is a MOS transistor having a threshold voltage-adjustable property, a gate electrode of the neuron transistor is connected to each voltage output end of the first-layer synaptic array, and a drain electrode of the neuron transistor is connected to each voltage input end of the second-layer synaptic array. Thus, it is possible to satisfy the decision computation and output of different synaptic array output values by adjusting the magnitude of the threshold voltage of the transistor. The neuron circuit requires only one transistor in cooperative connection with the first-layer synaptic array and the second-layer synaptic array to implement the ReLU activation function; therefore, a significant improvement is achieved in terms of energy efficiency, delay reduction, and space utilization.

6 Claims, 8 Drawing Sheets

LOW-POWER AND COMPACT NEURON CIRCUIT IMPLEMENTING RELU ACTIVATION FUNCTION

FIELD

The present disclosure relates to the field of complementary-metal-oxide-semiconductor (CMOS) circuits and, more particularly, to a low-power and compact neuron circuit implementing a rectified linear unit (ReLU) activation function.

BACKGROUND

Artificial neural networks are inspired by biology. A human brain is an extremely complex network composed of multiple neurons connected to each other, an artificial neural network, modeled after a structure of a biological neural network, is constructed by simulating neurons with simple computational units and connecting enormous computational units closely somehow.

Among various forms of artificial neural networks, the convolution neural network (CNN) is a feed-forward neural network that operates most like human brain neurons. The basic structure of a convolutional neural network consists of an input layer, a convolution layer, an activation layer, a pooling layer, a full connection layer, and an output layer. The activation layer serves to activate the features extracted by the convolution layer. Since convolution is a linear change through the multiplication and addition of an input matrix and a convolution kernel matrix, the activation layer needs to perform a nonlinear mapping on the convolution; as such, a function obtained by fitting with the neural network may adapt to the complex function fluctuation. In a convolutional neural network, a rectified linear unit (ReLU) function is generally used as an activation function. The ReLU function as the activation function can limit a value smaller than 0 to 0 and enable a value greater than or equal to 0 to be saved and output; the ReLU function features a fast computation and can solve more complex problems better, which is more desirable as an artificial neural network modeled after a biological one. At present, the concept of the convolution neural network has been applied to complementary-metal-oxide-semiconductor (CMOS) circuits.

A conventional CMOS circuit typically takes four transistors for layout connection as a ReLU function neuron cell, and as shown in FIG. 1, the four transistors are NM1, NM2, PM1, and PM2, respectively; a plurality of such neuron cells form a neuron circuit. Since a convolutional neural network consists of hundreds of layers, the outputs of each layer are separately connected to artificial neurons with weighted and non-linear activation functions for computation. However, in the face of the massive data generated in the era of big data, a ReLU function neuron circuit based on a plurality of the above-mentioned ReLU function neuron cells needs to access a memory frequently, which not only increases the power consumption but also causes data redundancy and less effective transmission, hindering the development of neural network acceleration chips.

To reduce the computational load and power consumption of the conventional neuron circuits implementing the ReLU function and follow the trend of high-density integration and miniaturization of integrated circuits, a concept of "processing in memory" is proposed. The processing in memory is performed directly in a memory array, and in this situation, a main processing module only needs to send input data to the memory array; after several clock cycles, the memory array returns a processed result to the main processing module. Herein, in the case of processing AI-related tasks, neural network weights are stored in the above-mentioned memory array, and after the main processing module directly sends the input information of the neural network to the memory array, the processing in memory can be started. However, most of the non-volatile memory-based in-memory computations still rely on a general-purpose processor to compute and propagate the activation function of each layer; moreover, analog complementary-metal-oxide-semiconductor (CMOS) circuits and analog-to-digital converters (ADC) with reconfigurable functional mapping for realizing non-linear activation both require a large number of adders, multipliers, and digital-to-analog converters, which results in the bulky size, large volume, and high power consumption of neuron circuits, failing to meet the need for low-power and compact neuron circuits.

SUMMARY

The technical problem to be solved by the present disclosure is how to provide a low-power and compact neuron circuit implementing a rectified linear unit (ReLU) activation function that features a simple and compact structure and low power consumption in view of the above-mentioned prior art.

The technical solution adopted by the present disclosure to solve the above-mentioned technical problem is a low-power and compact neuron circuit implementing a ReLU activation function, including:

a first-layer synaptic array having at least one voltage output end;

a neuron transistor, which is a MOS transistor with a threshold voltage-adjustable property, the neuron transistor having a gate electrode, a source electrode, and a drain electrode, and the gate electrode being connected to each voltage output end of the first-layer synaptic array, wherein a single neuron transistor acts as a neuron;

a second-layer synaptic array having at least one voltage input end, each voltage input being connected to the drain electrode of the neuron transistor;

wherein a voltage output value of the voltage output end of the first-layer synaptic array is denoted as X, a threshold voltage of the neuron transistor is denoted as Vth, and a gate voltage of the neuron transistor is denoted as Vg, where Vg=X;

in a case where the voltage output value X is less than the threshold voltage Vth, the MOS transistor is not turned on, the neuron is not activated, and an output of the neuron is constant at 0;

in a case where the voltage output value X is greater than or equal to the threshold voltage Vth, the MOS transistor is turned on, the neuron is activated, and the output of the neuron is X-Vth. Alternatively, in the low-power and compact neuron circuit implementing a ReLU activation function, the neuron transistor is an NMOS transistor or a PMOS transistor.

In a further embodiment, in the low-power and compact neuron circuit implementing a ReLU activation function, the threshold voltage-adjustable property of the MOS transistor is achieved through ferroelectric polarization reversal of a gate electrode of a ferroelectric-polarized MOS transistor, or changing a channel doping concentration, or doping a channel ion implantation concentration, or adjusting a gate oxide thickness, or by a gate electrode having a volatile threshold switching property.

Further, in the low-power and compact neuron circuit implementing a ReLU activation function, the neuron transistor is a ferroelectric-polarized MOS transistor.

Further, in the low-power and compact neuron circuit implementing a ReLU activation function, a doping concentration of the doping electrode is adjusted during the preparation of the drain electrode of the MOS transistor to adjust a resistance value of the drain electrode. Furthermore, in the low-power and compact neuron circuit implementing a ReLU activation function, the ferroelectric-polarized MOS transistor is prepared by:

employing a conventional front-end process for preparing a CMOS transistor, forming a shallow trench isolation region on a substrate, and isolating an active region by the shallow trench isolation region;

forming wells corresponding to each active region through ion implantation; wherein the NMOS well features a P-well, and the PMOS features an N-well;

forming a gate pattern through photolithographic development, depositing a $SiO_2$ layer on an upper surface of the substrate, depositing a ferroelectric material layer on an upper surface of the $SiO_2$ layer, and then depositing a polysilicon layer on an upper surface of the ferroelectric material layer;

etching the polysilicon layer, the ferroelectric material layer, and a $SiO_2$ layer on the basis of the gate pattern to form a gate structure; and protecting the gate structure through sidewall masked isolation, and performing ion doping on both ends of the gate structure to form two ends of the source electrode and the drain electrode; employing a conventional CMOS back-end process to prepare the MOS transistor, wherein the MOS transistor, after preparation, is the ferroelectric-polarized MOS transistor by adjusting a doping concentration during preparation of the drain electrode so as to adjust a resistance value of the drain electrode.

Alternatively, in the low-power and compact neuron circuit implementing a ReLU activation function, the ferroelectric material layer is a HfZrO layer or a $BaTiO_3$ (BTO) layer. In a further improvement, in the low-power and compact neuron circuit implementing a ReLU activation function, a resistance value of a resistor connected in series between the neuron transistor and a next layer of array is denoted as R, and then $$R=(Vg-Vth-Vd)/[\beta \cdot Vd(Vg-Vth-0.5Vd)];$$

$$\beta=(\mu \cdot W \cdot C_{ox})/L;$$

where Vg is a gate voltage of the neuron transistor, Vth is a threshold voltage of the neuron transistor, Vd is a drain-source voltage of the neuron transistor, μ is a carrier mobility in a channel of the neuron transistor, W is a channel width of the neuron transistor, $C_{ox}$ is a gate oxygen capacitance value of the neuron transistor, and L is a channel length of the neuron transistor.

Still further, in the low-power and compact neuron circuit implementing a ReLU activation function, the resistance value R=1/(β·Vd), where Vd=0.1V.

The present disclosure has the following advantageous effects compared with the prior art. Firstly, in the low-power and compact neuron circuit implementing a ReLU activation function of the present disclosure, the neuron transistor is a MOS transistor having a threshold voltage-adjustable property; the gate electrode of the neuron transistor is connected to each voltage output end of the first-layer synaptic array, and the drain electrode of the neuron transistor is connected to each voltage input end of the second-layer synaptic array. Since the threshold voltage of the neuron transistor is adjustable, it is possible to satisfy the decision computation and output of different synaptic array output values by adjusting the magnitude of the threshold voltage of the transistor. The neuron circuit requires only one transistor in cooperative connection with the first-layer synaptic array and the second-layer synaptic array for one neuron of the neuron circuit to implement the ReLU activation function; therefore, a significant improvement is achieved in terms of energy efficiency, delay reduction, and space utilization. Secondly, the low-power and compact neuron circuit implementing a ReLU activation function of the present disclosure has a simple circuit design and can be prepared through a less complicated process, and a neuron transistor as a neuron can be prepared through a conventional CMOS process, showing higher applicability.

DETAILED DESCRIPTION

The present disclosure will be described below in further detail with reference to the accompanying drawings.

Figure 1:
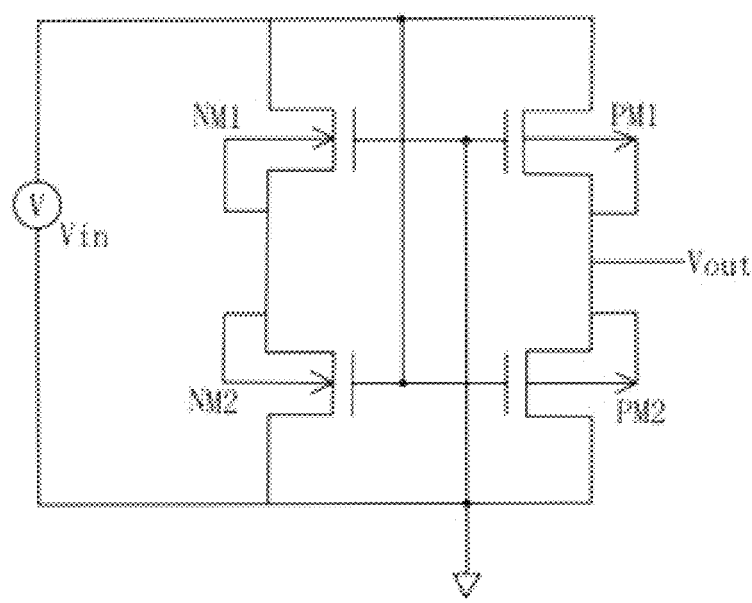
FIG. 1 is a schematic diagram of a ReLU function neuron cell in the prior art.
Figure 2:
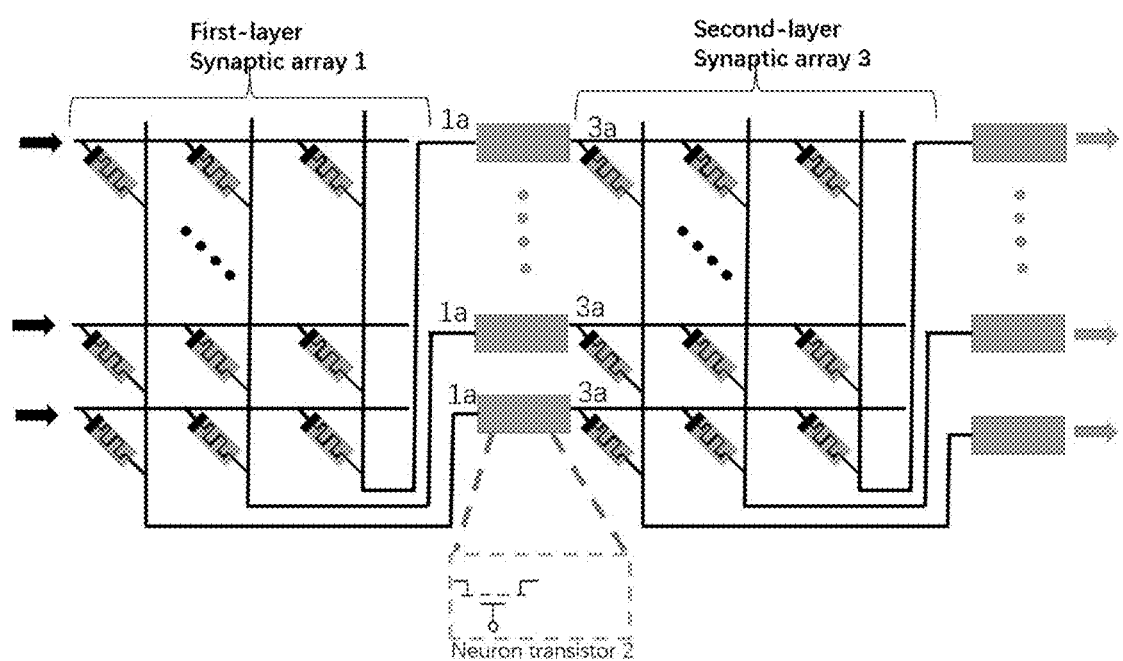
FIG. 2 is a schematic diagram of a low-power and compact neuron circuit implementing a ReLU activation function in an embodiment of the present disclosure.

This embodiment provides a low-power and compact neuron circuit implementing a ReLU activation function. Specifically, with reference to FIG. 2, the low-power and compact neuron circuit implementing a ReLU activation function of this embodiment includes a first-layer synaptic array 1, a neuron transistor 2, and a second-layer synaptic array 3, where the first-layer synaptic array 1 has a plurality of voltage output ends 1a, and the second-layer synaptic array 3 has a plurality of voltage input ends 3a; the neuron transistor 2 is a MOS transistor with a threshold voltage-adjustable property, and the neuron transistor 2 has a gate electrode g, a source electrode s and a drain electrode d; the gate electrode g is connected to each voltage output end 1a of the first-layer synaptic array 1; the drain electrode d of the neuron transistor 2 is connected to each voltage input 3a of the second-layer synaptic array 3. Herein, a single neuron transistor 2 serves as a neuron; for example, the neuron transistor 2 here may be an NMOS transistor or a PMOS transistor. In this embodiment, a voltage output value of each voltage output end 1a of the first-layer synaptic array 1 is denoted as X, a threshold voltage of the neuron transistor 2 is denoted as Vth, a gate voltage of the neuron transistor 2 is denoted as Vg, where Vg=X, and a voltage input value of each voltage input end 3a of the second-layer synaptic array 3 is denoted as Y;

in the case where the voltage output value X is less than the threshold voltage Vth, that is, when Vg<Vth, the MOS transistor is not turned on, the neuron is not activated, and an output of the neuron is constant at 0;

in the case where the voltage output value X is greater than or equal to the threshold voltage Vth, that is, Vg≥Vth, the MOS transistor is turned on, the neuron is activated, and the output of the neuron is X-Vth.

Figure 3:
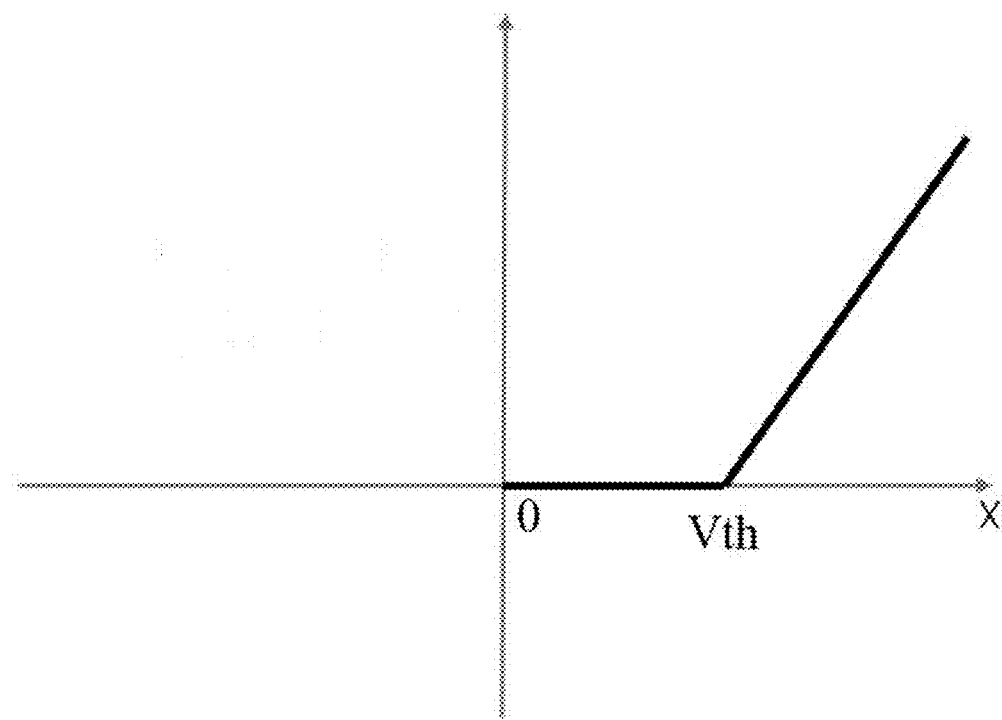
FIG. 3 is a schematic diagram of a ReLU function implemented by a neuron in an embodiment of the present disclosure.

That is to say, for each neuron, each time the synaptic array at an upper layer outputs a voltage value X greater than the threshold voltage Vth, a corresponding output value of the neuron is X-Vth, and the output value X-Vth of the neuron is transmitted to the synaptic array at a next lower layer; the input and output processes of the neuron satisfy the ReLU function (see FIG. 3). By adjusting the magnitude of the threshold voltage (Vth) of the transistor, it is possible to satisfy the decision computation and output of different synaptic array output values. Here, the ReLU function is as follows:

$$Relu(X) = \begin{cases} X - Vth & (X \geq Vth) \\ 0 & (X < Vth) \end{cases}$$

As an implementation, the above-mentioned threshold voltage-adjustable property of the MOS transistor may be achieved through ferroelectric polarization reversal of a gate electrode of a ferroelectric-polarized MOS transistor, or changing a channel doping concentration, or doping a channel ion implantation concentration, or adjusting a gate oxide thickness, or by a gate electrode having a volatile threshold switching property.

Figure 4:
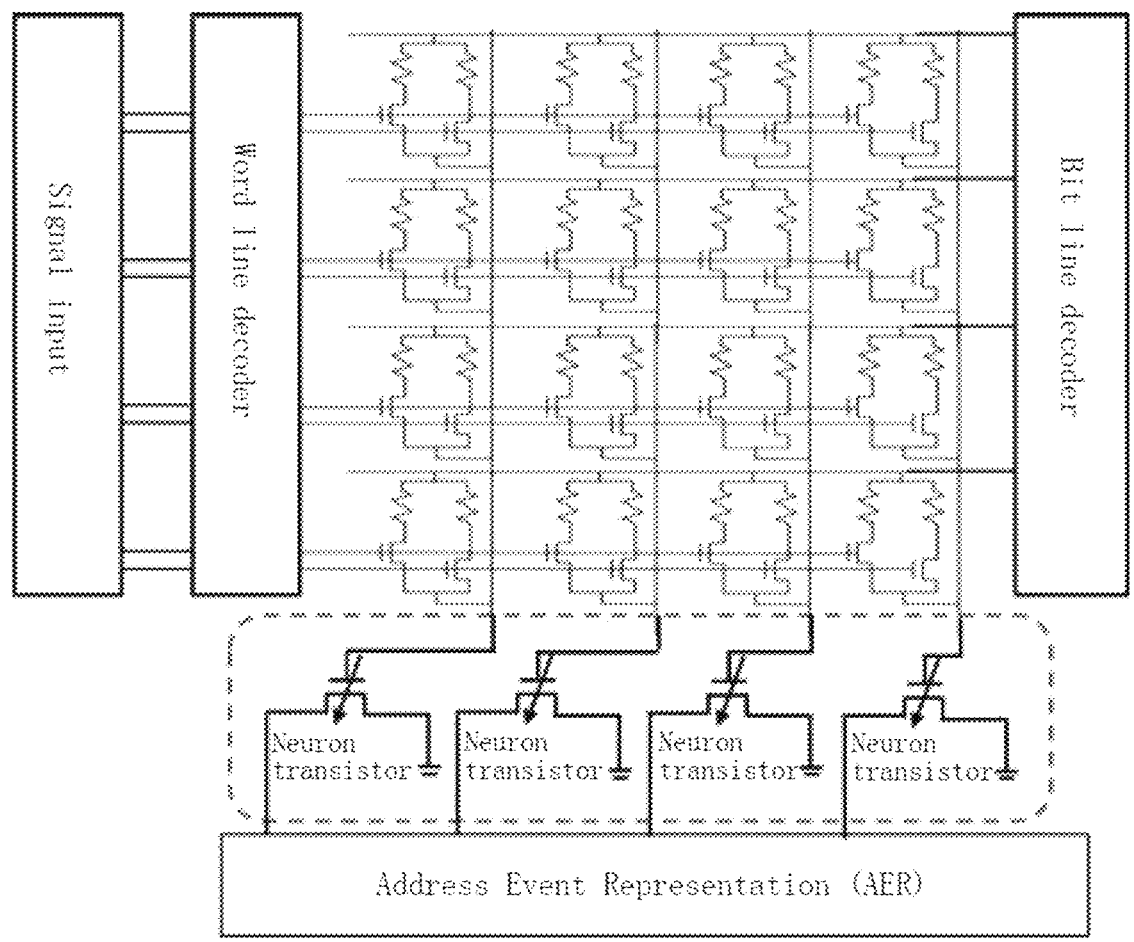
FIG. 4 is a schematic diagram of a low-power and compact neuron circuit implementing a ReLU activation function according to an embodiment of the present disclosure in use.

Here, the above-mentioned low-power and compact neuron circuit implementing a ReLU activation function in use is shown in FIG. 4. The synaptic array is a 4×4 array with four synapses in each column connected to one neuron transistor. Herein, the 4×4 array as the synaptic array is configured between a word line decoder and a bit line decoder.

Figure 5:
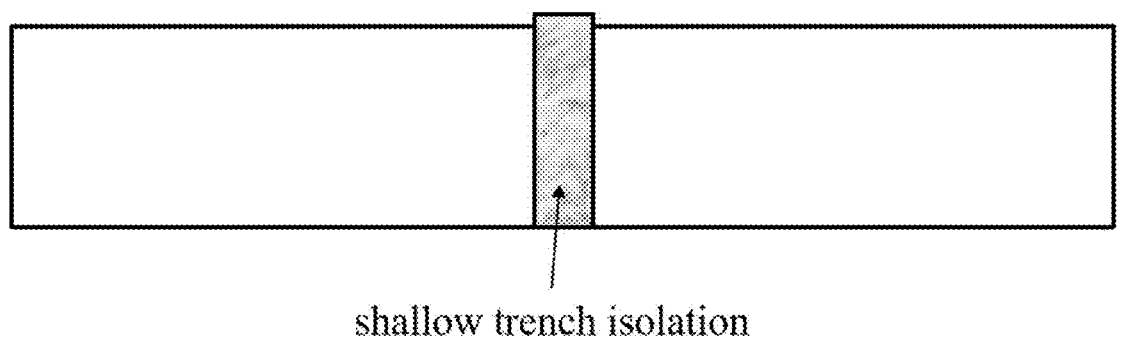
FIG. 5 is a schematic diagram illustrating a structure where a shallow trench isolation region is formed on a substrate during the preparation of a ferroelectric-polarized MOS transistor according to an embodiment of the present disclosure.
Figure 6:
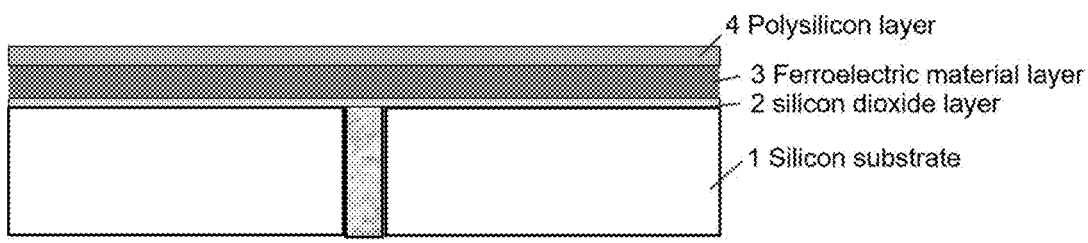
FIG. 6 is a schematic view showing a structure after depositing a $SiO_2$ layer, a ferroelectric material layer, and a polysilicon layer successively on the basis of the structure shown in FIG. 5.
Figure 7:
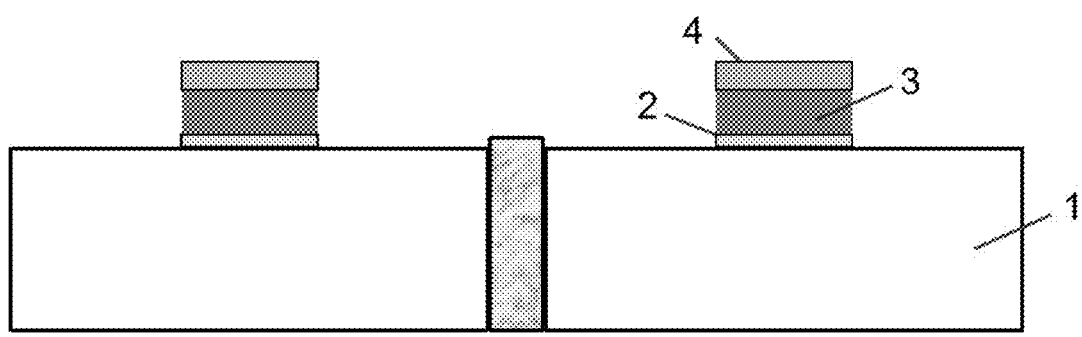
FIG. 7 is a schematic view of a gate structure formed on the basis of the structure shown in FIG. 6.
Figure 8:
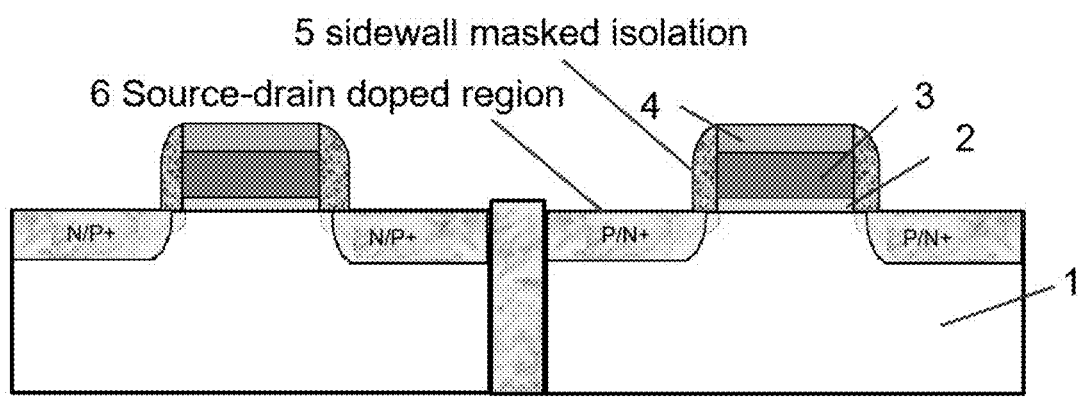
FIG. 8 is a schematic diagram of the ferroelectric-polarized MOS transistor after the preparation.

For example, in this embodiment, the neuron transistor 2 in the low-power and compact neuron circuit implementing a ReLU activation function described above may also be a ferroelectric-polarized MOS transistor. Herein, the ferroelectric-polarized MOS transistor may be prepared by:

step S1, employing a conventional front-end process for preparing a CMOS transistor, forming a shallow trench isolation region 22 on a substrate 21, and isolating an active region by the shallow trench isolation region 22, where the substrate 21 is a silicon substrate, and the structure formed here is shown in FIG. 5;

step S2, forming wells corresponding to each active region through ion implantation, where the NMOS features a P-well, and the PMOS features an N-well;

step S3, forming a gate pattern through photolithographic development, depositing a $SiO_2$ layer 23 on an upper surface of the substrate 21, depositing a ferroelectric material layer 24 on an upper surface of the $SiO_2$ layer 23, and then depositing a polysilicon layer 25 on an upper surface of the ferroelectric material layer 24, where the ferroelectric material layer 24 here is a HfZrO layer or a BTO layer, and the structure obtained in step S3 is shown in FIG. 6; step S4, etching the polysilicon layer 25, the ferroelectric material layer 24, and a $SiO_2$ layer 23 on the basis of the gate pattern to form a gate structure, where the gate structure is shown in FIG. 7; and step S5, protecting the gate structure through sidewall masked isolation, and performing ion doping on both ends of the gate structure to form two ends of the source electrode and the drain electrode; employing a conventional CMOS back-end process to prepare the MOS transistor, where the MOS transistor, after preparation, is the ferroelectric-polarized MOS transistor, a structure of which is shown in FIG. 8, in which a structure denoted by 26 is a gate protection wall, and a region denoted by 27 is a source-drain doped region.

It should be noted that in the case where the neuron transistor 2 is a ferroelectric-polarized MOS transistor, a resistance value of the drain electrode of the neuron transistor in the above-mentioned low-power and compact neuron circuit implementing a ReLU activation function is calculated as follows. Given that a resistance value of a resistor connected in series between the neuron transistor and a next layer of array is R, $$R=(Vg-Vth-Vd)/[\beta \cdot Vd(Vg-Vth-0.5Vd)];$$

$$\beta=(\mu \cdot W \cdot C_{ox})/L;$$

where Vg is a gate voltage of the neuron transistor, Vth is a threshold voltage of the neuron transistor, Vd is a drain-source voltage of the neuron transistor, µ is a carrier mobility in a channel of the neuron transistor, W is a channel width of the neuron transistor, $C_{ox}$ is a gate oxygen capacitance value of the neuron transistor, and L is a channel length of the neuron transistor.

As is well known to those skilled in the art, the gate oxide layer herein is an insulating medium between the gate electrode of the transistor and the silicon substrate, typically employing silicon dioxide or the like, for insulating and preventing leakage of electricity. Herein, in this embodiment, the drain-source voltage Vd of the neuron transistor 2 is 0.1V, and the resistance value R=1/(β·Vd).

Although the preferred embodiments of the present disclosure are described in detail above, it is apparent that modifications and variations of the present disclosure will occur to those skilled in the art. It is intended that the present disclosure be construed as including all such modifications and variations insofar as they come within the scope of the spirits and principles thereof.

within the scope of the present disclosure.

The invention claimed is:

1. A low-power and compact neuron circuit implementing a rectified linear unit (ReLU) activation function, comprising:
   a first-layer synaptic array (1) having at least one voltage output end (1a);
   a neuron transistor (2), which is a metal-oxide-semiconductor (MOS) transistor with a threshold voltage-adjustable property, the neuron transistor (2) having a gate electrode (g), a source electrode (s) and a drain electrode (d), and the gate electrode (g) being connected to each voltage output end (1a) of the first-layer synaptic array (1), wherein a single neuron transistor (2) acts as a neuron;

a second-layer synaptic array (3) having at least one voltage input end (3a), each voltage input (3a) being connected to the drain electrode (d) of the neuronal transistor (2);

wherein a voltage output value of the voltage output end (1a) of the first-layer synaptic array (1) is denoted as X, a threshold voltage of the neuron transistor (2) is denoted as Vth, and a gate voltage of the neuron transistor (2) is denoted as Vg, where Vg=X;

in a case where the voltage output value X is less than the threshold voltage Vth, the metal-oxide-semiconductor (MOS) transistor is not turned on, the neuron is not activated, and an output of the neuron is constant at 0;

in a case where the voltage output value X is greater than or equal to the threshold voltage Vth, the metal-oxide-semiconductor (MOS) transistor is turned on, the neuron is activated, and the output of the neuron is X-Vth;

wherein the neuron transistor (2) is a ferroelectric-polarized metal-oxide-semiconductor (MOS) transistor;

wherein the ferroelectric-polarized metal-oxide-semiconductor (MOS) transistor is prepared by:

employing a conventional front-end process for preparing a complementary-metal-oxide-semiconductor (CMOS) transistor, forming a shallow trench isolation region on a substrate, and isolating an active region by the shallow trench isolation region;

forming wells corresponding to each active region through ion implantation; wherein the N-channel-metal-oxide-semiconductor (NMOS) transistor features a P-well, and the P-channel-metal-oxide-semiconductor (PMOS) transistor features an N-well;

forming a gate pattern through photolithographic development, depositing a $SiO_2$ layer on an upper surface of the substrate, depositing a ferroelectric material layer on an upper surface of the $SiO_2$ layer, and then depositing a polysilicon layer on an upper surface of the ferroelectric material layer;

etching the polysilicon layer, the ferroelectric material layer, and a $SiO_2$ layer on the basis of the gate pattern to form a gate structure; and protecting the gate structure through sidewall masked isolation, and performing ion doping on both ends of the gate structure to form two ends of the source electrode and the drain electrode; employing a conventional complementary-metal-oxide-semiconductor (CMOS) back-end process to prepare the metal-oxide-semiconductor (MOS) transistor, wherein the metal-oxide-semiconductor (MOS) transistor, after preparation, is the ferroelectric-polarized metal-oxide-semiconductor (MOS) transistor by adjusting a doping concentration during the preparation of the drain electrode so as to adjust a resistance value of the drain electrode.

2. The low-power and compact neuron circuit implementing a rectified linear unit (ReLU) activation function according to claim 1, wherein the neuron transistor (2) is a N-channel-metal-oxide-semiconductor (NMOS) transistor or a P-channel-metal-oxide-semiconductor (PMOS) transistor.

3. The low-power and compact neuron circuit implementing a rectified linear unit (ReLU) activation function according to claim 1, wherein the threshold voltage-adjustable property of the metal-oxide-semiconductor (MOS) transistor is achieved through ferroelectric polarization reversal of a gate electrode of a ferroelectric-polarized metal-oxide-semiconductor (MOS) transistor, or changing a channel doping concentration, or doping a channel ion implantation concentration, or adjusting a gate oxide thickness, or by a gate electrode having a volatile threshold switching property.

4. The low-power and compact neuron circuit implementing a rectified linear unit (ReLU) activation function according to claim 1, wherein the ferroelectric material layer (24) is a HfZrO layer or a $BaTiO_3$ (BTO) layer.

5. The low-power and compact neuron circuit implementing a rectified linear unit (ReLU) activation function according to claim 1, wherein a resistance value of a resistor connected in series between the neuron transistor and a next layer of array is denoted as R, and then $$R=(Vg-Vth-Vd)/[\beta \cdot Vd(Vg-Vth-0.5Vd)];$$

$$\beta=(\mu \cdot W \cdot C_{ox})/L;$$

where Vg is a gate voltage of the neuron transistor, Vth is a threshold voltage of the neuron transistor, Vd is a drain-source voltage of the neuron transistor, μ is a carrier mobility in a channel of the neuron transistor, W is a channel width of the neuron transistor, $C_{ox}$ is a gate oxygen capacitance value of the neuron transistor, and L is a channel length of the neuron transistor.

6. The low-power and compact neuron circuit implementing a rectified linear unit (ReLU) activation function according to claim 5, wherein the resistance value R=1(β·Vd), where Vd=0.1V.

* * * * *